United States Patent
Miyamoto et al.

(10) Patent No.: US 10,680,216 B2
(45) Date of Patent: Jun. 9, 2020

(54) BATTERY MODULE AND VEHICLE

(71) Applicant: Kabushiki Kaisha Toshiba, Minato-ku (JP)

(72) Inventors: Hidenori Miyamoto, Niigata (JP); Takashi Enomoto, Niigata (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 199 days.

(21) Appl. No.: 15/455,584

(22) Filed: Mar. 10, 2017

(65) Prior Publication Data
US 2017/0187015 A1    Jun. 29, 2017

Related U.S. Application Data

(63) Continuation of application No. PCT/JP2015/055635, filed on Feb. 26, 2015.

(51) Int. Cl.
*H01M 2/10* (2006.01)
*H01M 10/48* (2006.01)
(Continued)

(52) U.S. Cl.
CPC ............ *H01M 2/1077* (2013.01); *B60K 1/04* (2013.01); *H01M 2/206* (2013.01);
(Continued)

(58) Field of Classification Search
CPC .. H01M 2/1077; H01M 2/206; H01M 2/0217; H01M 10/425; H01M 10/482;
(Continued)

(56) References Cited

U.S. PATENT DOCUMENTS

2002/0102454 A1*  8/2002  Zhou ................... H01M 2/1083
                                                            429/88
2010/0112425 A1*  5/2010  Dunn .................... H01M 2/024
                                                            429/99
(Continued)

FOREIGN PATENT DOCUMENTS

JP           7-142039         6/1995
JP          10-149805         6/1998
(Continued)

OTHER PUBLICATIONS

Office Action dated Dec. 5, 2017 in the coresponding Japanese Patent Application No. 2017-501774 (with English Translation) 12 pages.

(Continued)

*Primary Examiner* — Ula C Ruddock
*Assistant Examiner* — Matthew W Van Oudenaren
(74) *Attorney, Agent, or Firm* — Oblon, McClelland, Maier & Neustadt, L.L.P.

(57) ABSTRACT

A battery module includes a first cell group and a second cell group. The first cell group is provided with a plurality of cells each including a top surface on which terminal are arranged, a bottom face, a pair of long side faces, and short side faces shorter than the long side faces, the pair of long side faces being arranged to be opposed to each other. The second cell group is provided with a plurality of cells each including long side faces arranged to be opposed to each other, the cells being arranged at a position parallel with the first cell group.

11 Claims, 4 Drawing Sheets

(51) Int. Cl.
  *B60K 1/04*    (2019.01)
  *H01M 10/42*   (2006.01)
  *H01M 2/20*    (2006.01)
  *B60L 50/60*   (2019.01)
  *H01M 2/02*    (2006.01)

(52) U.S. Cl.
  CPC ....... *H01M 10/425* (2013.01); *H01M 10/482* (2013.01); *B60K 2001/0411* (2013.01); *B60L 50/66* (2019.02); *B60Y 2306/01* (2013.01); *H01M 2/0217* (2013.01); *H01M 2220/20* (2013.01)

(58) Field of Classification Search
  CPC ........... H01M 2220/20; H01M 2/1016; H01M 2/1083; H01M 2/1061; H01M 2/1072
  See application file for complete search history.

(56) References Cited

U.S. PATENT DOCUMENTS

| | | | |
|---|---|---|---|
| 2011/0020686 A1* | 1/2011 | Yamamoto | H01M 2/20 429/120 |
| 2011/0287298 A1 | 11/2011 | Park et al. | |
| 2012/0018238 A1 | 1/2012 | Mizoguchi et al. | |
| 2012/0055725 A1 | 3/2012 | Mizoguchi et al. | |
| 2012/0270097 A1* | 10/2012 | Yasui | H01M 2/1016 429/160 |
| 2016/0164054 A1* | 6/2016 | Yamamoto | H01M 2/1077 429/61 |

FOREIGN PATENT DOCUMENTS

| | | |
|---|---|---|
| JP | 2011-6051 A | 1/2011 |
| JP | 2011-6052 | 1/2011 |
| JP | 2011-243561 | 12/2011 |
| JP | WO2012/081140 A1 | 6/2012 |
| JP | 2013-133019 | 7/2013 |
| JP | 2016-72004 | 5/2016 |
| WO | WO 2012/081140 A1 | 6/2012 |
| WO | WO 2015/019510 A1 | 2/2015 |
| WO | WO2015019510 * | 2/2015 |

OTHER PUBLICATIONS

International Search Report dated May 19, 2015 in corresponding PCT/JP2015/055635.

* cited by examiner

BATTERY MODULE AND VEHICLE

CROSS-REFERENCE TO RELATED APPLICATION

This application is a continuation application of International Application No. PCT/JP2015/055635, filed Feb. 26, 2015, which designates the United States and is incorporated herein by reference.

FIELD

Embodiments of the present invention relate to a battery module to be mounted on a movable body such as a vehicle or the like, and a vehicle.

BACKGROUND

A movable body using electric energy, particularly a vehicle such as an automobile, equipped with a battery module having a plurality of cells is well-known. For example, the battery module is usually mounted together with an engine in a front part provided in front of a passenger cabin.

However, when mounting a battery module in a vehicle, it should be considered that cells in the battery module are protected from breakage.

SUMMARY

Embodiments provide a battery module having a structure for protecting cells in the battery module from breakage and a vehicle equipped with the battery module.

The battery module for a battery module includes a first cell group provided with a plurality of cells each including a first face on which terminals are arranged, a second face opposed to the first face, a pair of first side faces arranged between the first face and the second face, and a pair of second side faces shorter in width than the first side faces and arranged between the first face and the second face, wherein the plurality of cells in the first cell group are arranged in a row by opposing the first side faces of two adjacent cells; and a second cell group provided with a plurality of cells each including a third face on which terminals are arranged, a fourth face being opposed to the third face, a pair of third side faces arranged between the third face and the fourth face, and a pair of fourth side faces shorter in width than the third side faces and arranged between the third face and the fourth face, wherein the plurality of cells in the second cell group are arranged in a row by opposing the third side faces of two adjacent cells, wherein the first side faces and the third side faces are arranged perpendicular to each other.

DETAILED DESCRIPTION

First Embodiment

Figure 1:
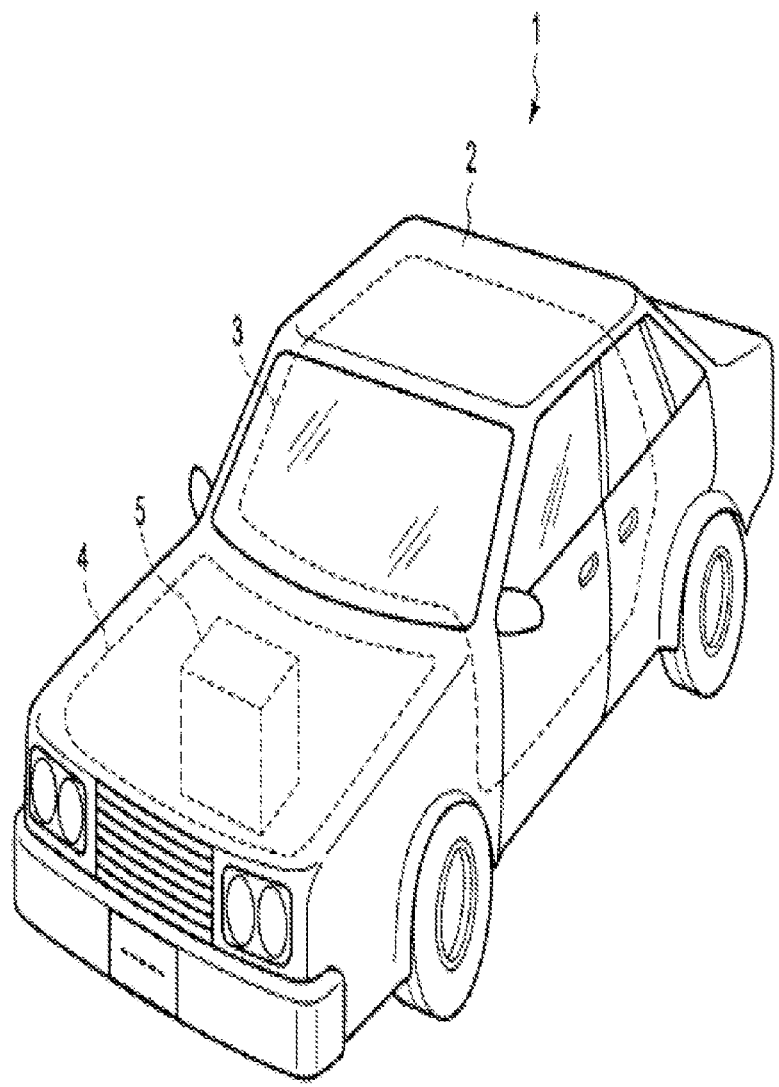
FIG. 1 is a perspective view showing an example of a configuration of a vehicle according to a first embodiment.
Figure 2:
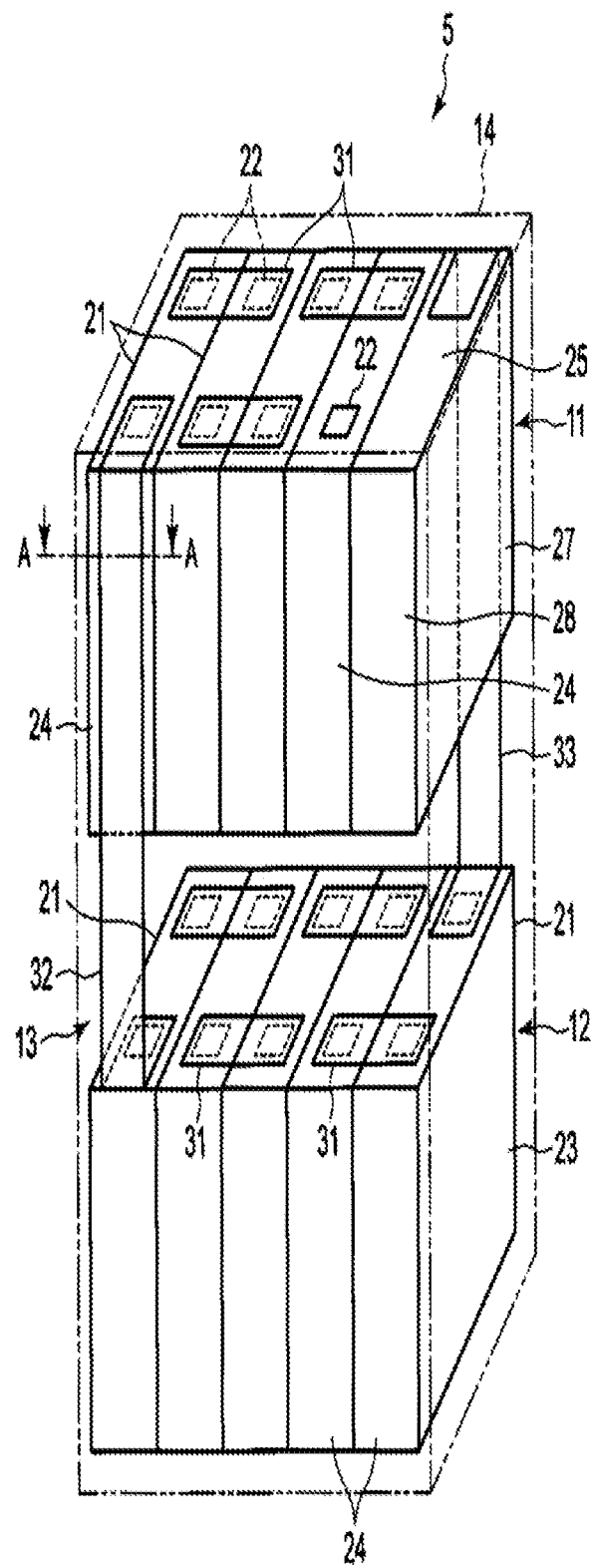
FIG. 2 is a perspective view showing an example of a configuration of a battery module to be arranged in the vehicle.
Figure 3:
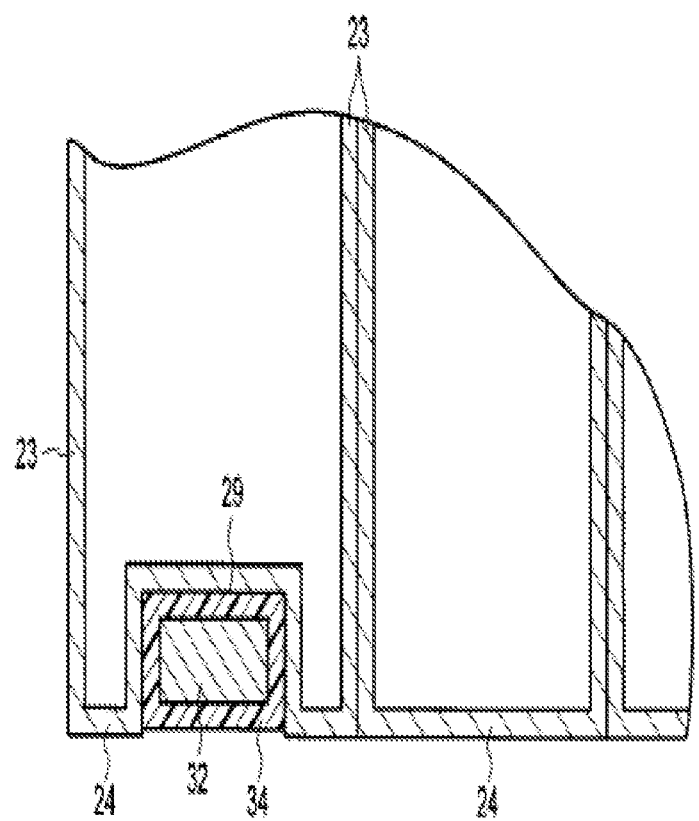
FIG. 3 is a cross-sectional view showing a configuration of the battery module.

Hereinafter, a vehicle 1 according to a first embodiment will be described with reference to FIGS. 1 to 3. FIG. 1 is a perspective view showing an example of a vehicle 1 according to the first embodiment. FIG. 2 is a perspective view showing an example of the configuration of a battery module 5 to be arranged in the vehicle 1. FIG. 3 is a cross-sectional view showing a part of the battery module 5.

The vehicle 1 is, for example, an automobile. As shown in FIG. 1, the vehicle 1 is provided with a vehicle body 2 having a passenger cabin 3, an engine (not shown), and the battery module 5. The vehicle body 2 includes a front part 4 provided in front of the passenger cabin 3. The front part 4 includes an engine compartment. The front part 4 accommodates therein the battery module 5, the engine, and the like.

As shown in FIG. 2, the battery module 5 is provided with a first cell group 12, a second cell group 11, connecting members 13, a case 14, and a cell monitoring unit (CMU) 25.

A cell 21 is, for example, a nonaqueous secondary battery cell. On a top surface of the cell 21, a pair of terminals 22 is provided. Side faces of the cell 21 are constituted of a pair of long side faces 23 and a pair of short side faces 24 shorter in width than the long side faces 23.

The first cell group 12 is provided with a plurality of cells 21 each formed into a rectangular parallelepiped shape.

The plurality of cells 21 of the first cell group 12 are arranged in such a manner that their long side faces 23 are opposed to each other. The first cell group 12 is constituted by arranging an odd number or an even number of cells 21. For example, the first cell group 12 is constituted of an odd number of cells 21. In this example, the first cell group 12 is constituted of five cells 21.

The second cell group 11 is provided with a plurality of cells 21, and the second cell group 11 is constituted by arranging the plurality of cells 21.

The second cell group 11 is arranged above the first cell group 12 in the case 14. Concretely speaking, the plurality of cells 21 of the second cell group 11 are arranged in a direction parallel to an array direction of the plurality of cells 21 of the first cell group 12. The plurality of cells 21 of the second cell group 11 are arranged above the plurality of cells 21 of the first cell group 12.

The second cell group 11 is constituted by arranging an odd number or an even number of cells 21 and the CMU 25. The second cell group 11 is constituted of cells 21 of a number smaller than that of the first cell group 12. For example, the second cell group 11 is constituted of an even number of cells 21. In this example, the second cell group 11 is constituted of four cells 21.

The CMU 25 is an electric equipment. The CMU 25 monitors, for example, a voltage and temperature of each cell 21, and further monitors current flowing into or from each cell 21. The CMU 25 has a shape approximately identical to the cell 21, i.e., a rectangular parallelepiped shape. That is, side faces of the CMU 25 are constituted of a pair of long side faces 27 each having a shape approximately identical to the long side face 23, and a pair of short side faces 28 each having a shape approximately identical to the short side face 24 and shorter in width than the long side faces 27. The CMU 25 is arranged in such a manner that a long side face 27 thereof is opposed to a long side face 23 of the cell 21 arranged at one end part of the plurality of cells 21 of the second cell group 11.

FIG. 3 shows a cross sectional view of the second cell group 11 along line AA of FIG. 2. Each of the cell 21 and the CMU 25, which are arranged at both ends of the second cell group 11, is provided with a groove 29 having a predetermined depth, and formed in one surface that is perpendicular to a front-back direction of the vehicle 1. The groove 29 is formed in, for example, one short side face 24 or 28, from a top surface to a bottom face of the cell 21 or the CMU 25, to a depth greater than a dimension of a thickness of a connecting member 13.

The first cell group 12 and the second cell group 11 are arranged in the case 14.

The connecting members 13 includes a plurality of first bus-bars 31 configured to electrically connect the cells 21 to each other, a second bus-bar 32 configured to electrically connect the first cell group 12 and second cell group 11 to each other, and a third bus-bar 33 configured to electrically connect the first cell group 12 and second cell group 11 to each other. Each of the plurality of first bus-bars 31 electrically connects one of a pair of terminals 22 of a cell 21 and one of a pair of terminals 22 of another cell 21 to each other, the cell 21 and the another cell 21 being adjacent to each other.

The second bus-bar 32 is covered with an insulator 34 except for both end parts. The second bus-bar 32, covered with the insulator 34, is formed in such a manner that a thickness dimension thereof is equal to or smaller than the depth of the groove 29 of the cell 21. The second bus-bar 32 is connected, at one end thereof, to a terminal 22 of the cell 21 arranged at one end of the second cell group 11. The second bus-bar 32 is connected, at the other end thereof, to a terminal 22 of the cell 21 arranged at one end of the first cell group 12. The second bus-bar 32 is arranged in the groove 29 of the cell 21.

The third bus-bar 33 is covered with an insulator 34 except for both end parts. The third bus-bar 33, covered with the insulator 34, is formed in such a manner that a thickness dimension thereof is equal to or smaller than the depth of the groove 29 of the CMU 25 and the depth of the groove 29 of the cell 21 The third bus-bar 33 is connected, at one end thereof, to a terminal 22 of the cell 21 arranged at one end of the first cell group 12. The other end of the third bus-bar 33 is arranged on the top surface of the CMU 25 arranged at one end of the second cell group 11. The third bus-bar 33 is arranged in the groove 29 of the CMU 25.

The case 14 is a case made of a resin, and is formed into a rectangular parallelepiped shape. The case 14 can accommodate therein the first cell group 12 and the second cell group 11 in a state where they are connected to each other by the connecting members 13 and are arranged one above the other. The case 14 insulates the first cell group 12 and second cell group 11 accommodated therein from the outside.

The case 14 accommodates therein the first cell group 12, second cell group 11, and connecting members 13 connected to each other in a state where a dimension from a bottom face of the first cell group 12 to a top surface of the second cell group 11 is greater than a dimension of the first cell group 12 or the second cell group 11 in a width direction or in a depth direction. The case 14 accommodates therein the first cell group 12 and second cell group 11 in a state where the short side faces 24 of the cells 21 of the first cell group 12 and the short side face 28 of the second cell group 11 are arranged flush with each other.

The case 14 is fixed to the front part 4 of the vehicle 1 so that the long side faces 23 of the cells 21 in the first cell group 12 and the second cell group 11 are along with the front-back direction of the vehicle 1, i.e., in the front-back direction of the vehicle body 2, and the cells 21 are arranged in a width direction of the vehicle 1.

According to the battery module 5 configured as described above, when the front part 4 is deformed by a front collision of a case where a physical object collides with the vehicle 1 at the front of the vehicle 1 in the front-back direction of the vehicle 1, part of the deformed front part 4 or the physical object comes into contact with the case 14 of the battery module 5 and a stress is applied to the case 14. Accordingly, a stress is applied by the case 14 to the first cell group 12 and the second cell group 11 accommodated in the case 14.

However, the first cell group 12 and the second cell group 11 include the plurality of long side faces 23 and the CMU 25, which are in the front-back direction of the vehicle 1 and are arranged in the width direction of the vehicle 1, whereby an area to which a buckling stress resulting from the front collision is applied can be increased. Thereby, it becomes possible to enhance a buckling strength of the first cell group 12 and the second cell group 11 against the stress resulting from the front collision. As a result, it is possible for the battery module 5 to prevent the cells 21 constituting the first cell group 12 and the second cell group 11, accommodated in the case 14, and the CMU 25 arranged together with the second cell group 11, and accommodated in the case 14, from being destroyed.

In the battery module 5 configured as described above, the number of cells 21 of the second cell group 11 arranged on an upper stage is smaller than that of the first cell group 12 arranged on a lower stage. Furthermore, the CMU 25 is lighter in weight than the cell 21 and is arranged on the upper stage together with the second cell group 11. Hence, the battery module 5 is configured in such a manner that the second cell group 11 arranged on the upper stage is lighter in weight than the first cell group 12. Thereby, it becomes possible to lower a position of a center of gravity of the battery module 5 and stabilize the module configuration. As a result, it is possible to simplify the configuration of the case 14.

The third bus-bar 33, configured as described above, and a terminal 22 of the cell 21 placed at an end of the first cell group 12 are arranged on a same side where a terminal 22 of the CMU 25 is placed. That is, the third bus-bar 33 connects the terminal 22 of the cell 21 arranged at the end of the first cell group 12 with the terminal 22 formed on the top surface of the CMU 25 arranged together with the second cell group 11. Thereby, it becomes possible for the third bus-bar 33 to arrange the terminals 22 of the cells 21 of the battery module 5 on a surface near the CMU 25 and opposed to an inner surface of the case 14 in a concentrated manner. As a result, it is possible for the third bus-bar 33 to improve handling/routing of wiring between a piece of electric equipment and the cells 21.

When the inner surface of the case 14 comes into contact with the first cell group 12 and the second cell group 11 without the case 14 being broken at the time of the front collision, a stress is applied from the inner surface of the case 14 to the first cell group 12 and the second cell group 11. In this case, the stress is simultaneously applied from the inner surface of the case 14 to the plurality of short side faces 24 and 28 which are arranged perpendicular to the front-back direction of the vehicle 1 and flush with each other. It becomes possible for the battery module configured as described above to reduce the stress to be applied to one short side face 24 or 28 by dispersing the stress applied from the inner surface of the case 14 to the plurality of short side faces 24 and 28. As a result, the battery module 5 can prevent the cells 21 and the CMU 25 constituting the first cell group 12, and the second cell group 11 accommodated in the case 14 from being destroyed.

The dimension of the thickness of each of the second bus-bar 32 and the third bus-bar 33, covered with the insulator 34, is made equal to the depth of the groove 29 or smaller than the groove 29, and hence each of the second bus-bar 32 and the third bus-bar 33 is positioned flush with or inside the short side face 24 of the cell 21 or the short side face 28 of the CMU 25. By this configuration, it becomes possible, when the stress is simultaneously applied from the inner surface of the case 14 to the plurality of short side faces 24 and 28, to prevent the second bus-bar 32 and the third bus-bar 33 from coming into contact with the inner surface of the case 14 earlier than the short side faces 24 and 28. As a result, it is possible to prevent the stress from being applied to the cells 21 and the CMU 25 by the second bus-bar 32 or the third bus-bar 33.

As described above, according to the battery module 5 of the first embodiment, the plurality of long side faces 23 and 27 in the front-back direction of the vehicle 1 and arranged to be lined up in the width direction of the vehicle 1 are provided, whereby it becomes possible to prevent the cells 21 and the CMU 25, constituting the second cell group 11, and the first cell group 12 from being destroyed by enhancing the buckling strength against the stress of the front collision.

Second Embodiment

Figure 4:
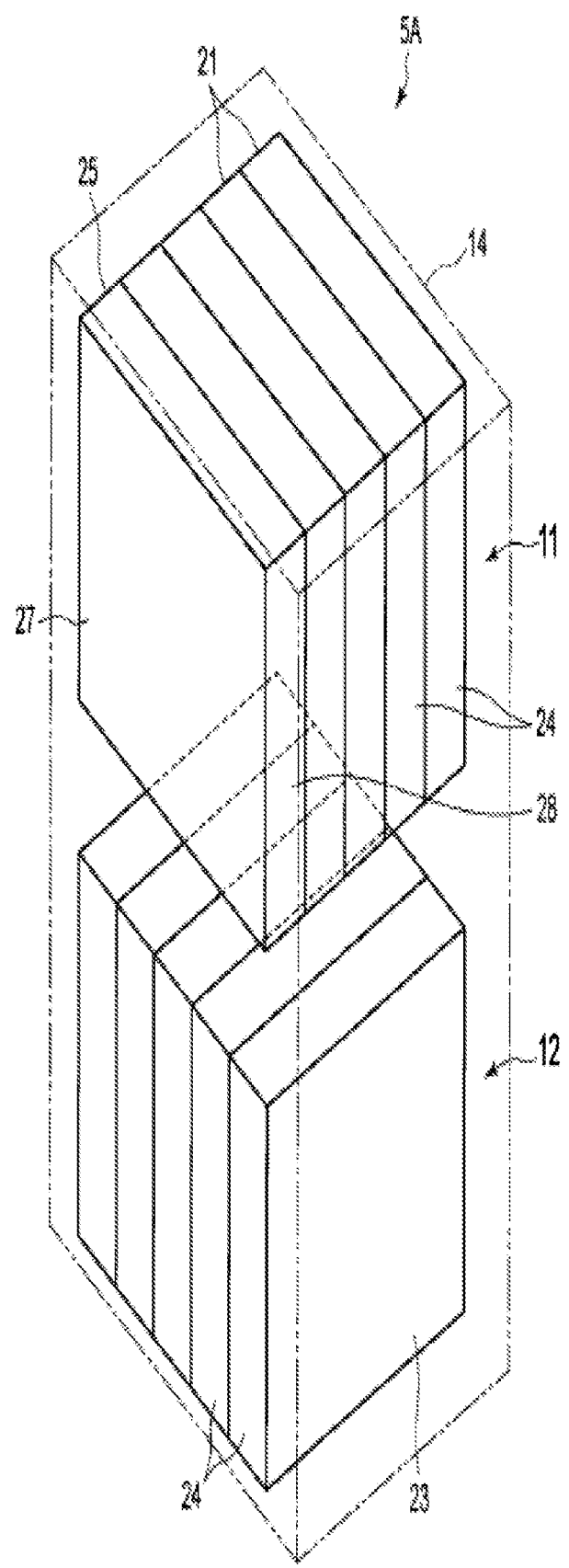
FIG. 4 is a perspective view showing an example of a configuration of a battery module of a vehicle according to a second embodiment.

Hereinafter, a battery module 5A to be used in a vehicle 1 according to a second embodiment will be described with reference to FIG. 4. FIG. 4 is a perspective view showing an example of a configuration of the battery module 5A of the vehicle 1 according to the second embodiment. It should be noted that configurations identical to the first embodiment described previously are denoted by identical reference signs, and their detailed descriptions are omitted.

The battery module 5A of the second embodiment is provided with a first cell group 12, a second cell group 11, connecting members 13, and a case 14. In the battery module 5A, the first cell group 12, and the second cell group 11 are arranged in two stages in such a manner that the long side faces 23 of the first cell group 12 and the long side faces 23 of the second cell group 11 are perpendicular to each other.

In the battery module 5A configured as described above, it becomes possible to improve the buckling strength against the stress, resulting from a side collision of the case where a physical object collides with the side of the vehicle 1 or from the front collision, in each of the first cell group 12 and the second cell group 11. As a result, the battery module 5A can prevent the cells 21 and the CMU 25, constituting the first cell group 12, and the second cell group 11 accommodated in the case 14 from being destroyed.

It should be noted that the number of the cells 21 to be included in each of the first cell group 12 and second cell group 11 is not limited to the examples of the first embodiment and the second embodiment described above. The number of the cells 21 to be included in each of the first cell group 12 and second cell group 11 may be any number if only the configuration in which an area to which the buckling stress is applied when stress is applied to the area is greater than an area to which the buckling stress is applied when stress is applied to the long side faces 23 is employed.

It should be noted that in the examples described above, it has been described, that the configuration in which the second cell group 11 arranged in the upper part of the case 14, in such a manner that the plurality of cells 21 is adjacent to the CMU 25. However, the second cell group 11 may be constituted only of cells 21.

It should be noted that a cushioning material may be provided between the second bus-bar 32 or the third bus-bar 33 and groove part 29 in the front-back direction of the vehicle 1 in such a thickness that the second bus-bar 32 or the third bus-bar 33 does not protrude from the groove part 29. The cushioning material is, for example, an elastic body lower in hardness than the second bus-bar 32 or the third bus-bar 33, and is deformed and generates an elastic stress according to an applied pressure. According to such a configuration, it becomes possible to reduce the stress applied to the second bus-bar 32 or the third bus-bar 33 by moving the second bus-bar 32 or the third bus-bar 33 toward a cell 21 side or a CMU 25 side according to the deformation of the cushioning material. The hardness of the cushioning material is made lower than the second bus-bar 32 or the third bus-bar 33, and hence it becomes possible to reduce the stress to be transmitted from the second bus-bar 32 or the third bus-bar 33 to the cell 21 or the CMU 25.

It should be noted that in the above-mentioned second embodiment, it has been described that in the battery module 5A, the first cell group 12 and the second cell group 11 are arranged in two stages in such a manner that the long side faces 23 of the first cell group 12, and the long side faces 23 of the second cell group 11 are perpendicular to each other. However, the configuration of the battery module 5A is not limited to this configuration. The battery module 5A may be configured in such a manner that the battery module 5A is further provided with a third cell group including long side faces forming an angle with the long side faces 23 of the first cell group 12 and second cell group 11, and arranged in parallel with the first cell group 12 and second cell group 11. When the battery module 5A is provided with the third cell group, it becomes possible to enhance the buckling strength against the stress from an oblique direction.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery module comprising:
a first cell group provided with a plurality of cells each including a first face on which terminals are arranged, a second face opposed to the first face, a pair of first side faces arranged between the first face and the second face, and a pair of second side faces shorter in width than the first side faces and arranged between the first face and the second face, wherein the plurality of cells in the first cell group are arranged in a row by opposing the first side faces of two adjacent cells; and
a second cell group provided with a plurality of cells each including a third face on which terminals are arranged, a fourth face being opposed to the third face, a pair of third side faces arranged between the third face and the fourth face, and a pair of fourth side faces shorter in width than the third side faces and arranged between the third face and the fourth face, wherein the plurality of cells in the second cell group are arranged in a row by opposing the third side faces of two adjacent cells, wherein the first side faces and the third side faces are arranged perpendicular to each other, and the second cell group is arranged above the first cell group such that:

a normal that intersects one of the first faces of the first cell group also intersects and is normal to one of the fourth faces of the second cell group, and the fourth faces of the second cell group oppose the first faces of the first cell group.

2. The battery module according to claim 1, wherein, on one side, the first side faces and the fourth side faces form a flat surface.

3. The battery module according to claim 1, wherein at least one of the cells placed on ends in the first cell group and second cell group has a groove on one of the second side faces or one of the fourth side faces so that a bus-bar, which connects one of the terminals arranged on the first face and one of the terminals arranged on the third face, is placed in the groove.

4. The battery module according to claim 3, wherein the groove has a depth greater than or equal to a thickness of the bus-bar.

5. The battery module according to claim 3, wherein a cushion material is placed between the groove and the bus-bar.

6. The battery module according to claim 1, further comprising a monitoring unit having a same shape as the plurality of cells and placed on an end in one of the first cell group or the second cell group.

7. A vehicle, comprising:

a vehicle body including a battery module, wherein the battery module includes:

a first cell group provided with a plurality of cells each including a first face on which terminals are arranged, a second face being opposed to the first face, a pair of first side faces being arranged between the first face and the second face, and a pair of second side faces shorter than the first side faces and being arranged between the first face and the second face, the pair of first side faces being arranged to be opposed to each other; and a second cell group provided with a plurality of cells each including a third face on which terminals are arranged, a fourth face being opposed to the third face, a pair of third side faces being arranged between the third face and the fourth face, and a pair of fourth side faces shorter than the third side faces and being arranged between the third face and the fourth face, the pair of third side faces being arranged to be opposed to each other, the first side faces of the first cell group, and the third side faces of the second cell group are arranged perpendicular to each other, and the second cell group is arranged above the first cell group such that:

a normal that intersects one of the first faces of the first cell group also intersects and is normal to one of the fourth faces of the second cell group, and fourth faces of the second cell group oppose the first faces of the first cell group.

8. The vehicle according to claim 7, wherein the first side faces of the first cell group and the fourth side faces of the second cell group are respectively arranged flush with each other.

9. The vehicle according to claim 7, wherein one first face of the cell arranged at one end part of the first cell group or one fourth face of the cell arranged at one end part of the second cell group is provided with a groove part, the groove part accommodates therein a connecting member configured to electrically connect a terminal of the cells of the first cell group and a terminal of the cells of the second cell group to each other, and the groove part is formed to a depth greater than or equal to a dimension of a thickness of the connecting member.

10. The vehicle according to claim 9, wherein a cushioning material is provided between the groove part and the connecting member.

11. The vehicle according to claim 8, wherein one first face of the cell arranged at one end part of the first cell group or one fourth face of the cell arranged at one end part of the second cell group is provided with a groove part, the groove part accommodates therein a connecting member configured to electrically connect a terminal of the cells of the first cell group and a terminal of the cells of the second cell group to each other, and the groove part is formed to a depth greater than or equal to a dimension of a thickness of the connecting member.

* * * * *